US008439797B2

(12) United States Patent
Asaoka (10) Patent No.: US 8,439,797 B2
(45) Date of Patent: May 14, 2013

(54) CONTINUOUSLY VARIABLE TRANSMISSION

(75) Inventor: Ryousuke Asaoka, Shizuoka (JP)

(73) Assignee: Yamaha Hatsudoki Kabushiki Kaisha, Iwata-shi (JP)

(*) Notice: Subject to any disclaimer, the term of this patent is extended or adjusted under 35 U.S.C. 154(b) by 845 days.

(21) Appl. No.: 11/836,003

(22) Filed: Aug. 8, 2007

(65) Prior Publication Data
US 2008/0039252 A1    Feb. 14, 2008

(30) Foreign Application Priority Data
Aug. 10, 2006   (JP) ................. 2006-218999

(51) Int. Cl.
*F16H 61/662*       (2006.01)
*B60W 10/00*        (2006.01)

(52) U.S. Cl.
USPC .............................. 477/44; 477/39

(58) Field of Classification Search ........... 474/8–46; 701/51, 54; 477/37, 109, 115, 906, 98, 156, 477/39, 44
See application file for complete search history.

(56) References Cited

U.S. PATENT DOCUMENTS

| | | | | |
|---|---|---|---|---|
| 4,321,991 A * | 3/1982 | Teijido et al. | .................... | 477/39 |
| 4,714,451 A * | 12/1987 | Yoshida et al. | ................. | 474/28 |
| 4,730,518 A * | 3/1988 | Miyawaki | ....................... | 477/49 |
| 4,731,044 A * | 3/1988 | Mott | ................. | 474/8 |
| 5,069,086 A * | 12/1991 | Murano et al. | .................. | 477/39 |
| 5,259,272 A * | 11/1993 | Yamamoto et al. | .............. | 477/45 |
| 5,658,216 A * | 8/1997 | Ochiai | ............. | 477/46 |
| 5,674,150 A * | 10/1997 | Morishita et al. | ............... | 477/39 |
| 5,853,347 A * | 12/1998 | Aoki et al. | ....................... | 477/45 |
| 5,924,450 A * | 7/1999 | Sakakibara et al. | ..... | 137/625.66 |
| 6,106,420 A * | 8/2000 | Ketelaars et al. | ................. | 474/2 |
| 6,188,943 B1 * | 2/2001 | Uchida et al. | ................... | 701/54 |
| 6,199,005 B1 * | 3/2001 | Iwata | ............... | 701/87 |
| 6,220,985 B1 * | 4/2001 | Okahara | ......................... | 477/46 |
| 6,524,224 B2 * | 2/2003 | Gagnon et al. | ................ | 477/175 |
| 6,633,806 B2 * | 10/2003 | Gochenour | ..................... | 701/51 |
| 6,663,524 B2 * | 12/2003 | Gu et al. | ............................ | 475/5 |
| 6,671,601 B2 * | 12/2003 | Abiru | .............. | 701/51 |
| 6,671,602 B1 * | 12/2003 | Speicher et al. | ................. | 701/52 |
| 6,712,724 B2 * | 3/2004 | Katou | ............... | 474/28 |
| 6,757,603 B2 * | 6/2004 | Nozaki | .............. | 701/51 |
| 6,813,551 B2 * | 11/2004 | Taniguchi et al. | .............. | 701/59 |
| 6,827,667 B2 * | 12/2004 | Kim | ................ | 477/112 |
| 6,893,378 B2 * | 5/2005 | Janecke et al. | ................. | 477/125 |

(Continued)

FOREIGN PATENT DOCUMENTS

DE     38 29 262 A1    3/1989
EP     0 225 153 A2    6/1987

(Continued)

*Primary Examiner* — Michael Mansen
*Assistant Examiner* — Henry Liu
(74) *Attorney, Agent, or Firm* — Rabin & Berdo, P.C.

(57) ABSTRACT

A straddle-type vehicle that prevents belt fluttering motion when the vehicle starts. A throttle opening degree sensor that detects an opening degree of a throttle is connected to and outputs to a controller a signal produced when the throttle opening degree switches from a closed state to an open state. When the vehicle starts from a standing state, the controller controls an actuator, according to the signal produced when the throttle opening degree switches from the closed state to the open state, to move a movable flange from a normal position in the standing state in a direction to narrow the groove width of a primary sheave.

19 Claims, 5 Drawing Sheets

U.S. PATENT DOCUMENTS

| | | | |
|---|---|---|---|
| 7,029,410 B2 * | 4/2006 | Sawada et al. | 474/28 |
| 7,039,516 B2 * | 5/2006 | Yamaguchi et al. | 701/51 |
| 2005/0119076 A1 * | 6/2005 | Chonan et al. | 474/29 |
| 2005/0233842 A1 * | 10/2005 | Shioiri et al. | 474/19 |
| 2006/0003866 A1 * | 1/2006 | Unno et al. | 477/44 |
| 2006/0068953 A1 | 3/2006 | Tsukada et al. | |

FOREIGN PATENT DOCUMENTS

| | | |
|---|---|---|
| JP | 60-222648 | 11/1985 |
| JP | 04-157242 | 5/1992 |
| JP | 04-210156 | 7/1992 |
| JP | 9-329229 | 12/1997 |

\* cited by examiner

CONTINUOUSLY VARIABLE TRANSMISSION

RELATED APPLICATIONS

This application claims the benefit of priority under 35 USC 119 of Japanese patent application no. 2006-218999, filed on Aug. 10, 2006, which application is hereby incorporated by reference in its entirety.

BACKGROUND OF THE INVENTION

1. Field of the Invention

This invention relates to a continuously variable transmission and, in particular, to an electronically-controlled belt-type continuously variable transmission.

2. Description of Related Art

A V-belt type continuously variable transmission is widely used on vehicles such as scooter-type two-wheeled vehicles. The V-belt type continuously variable transmission includes a primary sheave disposed on a primary shaft for receiving output of a power source such as an engine, and a secondary sheave disposed on a secondary shaft for the output to be taken out to a drive wheel. A V-belt is routed around the primary and secondary sheaves and continuously changes a transmission ratio between the sheaves by changing groove widths of the sheaves with a groove width regulating mechanism, thereby regulating the round routing radii of the V-belt on the respective sheaves.

The primary and secondary sheaves typically comprise a fixed flange and a movable flange forming a V-groove therebetween. The movable flanges are freely movable in the axial direction on the primary or secondary shaft. The groove width regulating mechanism continuously regulates the transmission ratio by moving the movable flanges.

An electric motor may be used to move the movable flanges. The motion thrust of the electric motor can move the movable flange both to narrow (toward top ratio) and widen (toward low ratio) the primary sheave groove width, thereby freely regulating the groove widths (see, for example, JP-3043061).

Conversely, in a mechanical continuously variable transmission, roller weights disposed inside the primary sheave move outward due to centrifugal force and press and cause the movable flange on the primary sheave side to move. The groove width of each sheave is regulated by the balance between the pressing force of the roller weights of the primary sheave and the force of a spring and a torque cam of the secondary sheave.

Because centrifugal force works on the roller weights along with rotation of the primary sheave caused by engine torque, a belt pressing force on the primary sheave side is produced immediately following an increase in engine revolutions at the time of start. By the pressing force, the belt routed around both sheaves becomes taut and does not flutter due to variations in torque at the time of start.

On the other hand, in an electronic continuously variable transmission, while displacement of the movable flange on the secondary sheave side is effected by belt pressing force of the spring and the torque cam, as in the mechanical continuously variable transmission, displacement of the movable sheave on the primary sheave side is controlled with the electric motor. Until vehicle speed exceeds a specified value, the movable flange is controlled to be held to a low position in which the primary sheave groove width becomes the maximum.

With the above constitution, the electric motor does not work until the vehicle speed reaches a specified value, and the movable flange on the primary sheave side remains fixed to the low position, so that no belt pressing force is produced. Even if the belt on the primary sheave side makes motion in slackening direction, the movable sheave cannot follow the motion. Therefore, the belt might flutter. If the belt flutters at the time of start, the rider may feel uncomfortable because of vibration caused by the flutter, or the flutter may cause an unusual or loud noise.

SUMMARY OF THE INVENTION

This invention has been made in view of these circumstances and prevents fluttering motion of the belt at the time of starting the vehicle.

Accordingly, an electronically-controlled belt-type continuously variable transmission according to the invention includes a controller and an actuator connected to the controller. A throttle opening degree sensor detects an opening degree of a throttle, and outputs to the controller a signal produced at least when the throttle opening degree is switched from a closed state to an open state. A primary sheave comprises a fixed flange and a movable flange attached to a rotary shaft. The actuator regulates a groove width of the primary sheave by controlling motion of the movable flange. A belt is routed around V-grooves of the primary sheave and a secondary sheave to continuously change a transmission ratio by changing groove widths of the primary and secondary sheaves. At a time a vehicle starts from a standing state, the controller, on the basis of the signal produced when the throttle opening degree is switched from the closed state to the open state, controls the actuator to move the movable flange from an ordinary position in the standing state in a direction of decreasing the groove width of the primary sheave.

In one embodiment, the controller controls the actuator to move the movable flange that has moved in the direction of decreasing the groove width of the primary sheave back to the ordinary position on the basis of a specified condition.

In one embodiment, a vehicle speed sensor for detecting vehicle speed is connected to the controller, and the specified condition is that the detected vehicle speed exceeds a threshold value.

In one embodiment, the specified condition is elapse of a specified period of time after the throttle opening degree is switched from the closed state to the open state.

In one embodiment, the secondary sheave comprises a fixed flange and a movable flange attached to a rotary shaft, and the movable flange of the secondary sheave is urged with a spring and a torque cam in a direction of decreasing groove width.

In one embodiment, at the time the vehicle starts from the standing state, the movable flange that has moved in the direction of decreasing the groove width increases tension on the belt routed around the V-groove of the primary sheave.

According to the invention, in the continuously variable transmission electronically controlled by the controller, at the time the vehicle starts from the standing state, the controller controls the actuator on the basis of the signal generated when the throttle opening degree switches from the closed state to the open state to move the movable flange on the primary sheave side from the ordinary (low) position in the standing state in a direction (toward the top side) of decreasing the groove width of the primary sheave. In other words, at the time of starting, the actuator pushes the movable flange of the primary sheave from the low position toward the top side.

Because load is applied to the belt routed around the primary sheave side by pushing the movable flange of the primary sheave from the low position toward the top side, the belt is prevented from fluttering at the time the vehicle starts.

Other features and advantages of the invention will be apparent from the following detailed description, taken in conjunction with the accompanying drawings which illustrate, by way of example, various features of embodiments of the invention.

DETAILED DESCRIPTION OF THE INVENTION

In developing an electronic belt-type continuously variable transmission that controls a transmission ratio by displacing a movable flange on a primary sheave side with an electric motor, the inventor found a problem in that, when a vehicle starts from a standing state, the belt flutters and the vehicle cannot be started smoothly. Such belt fluttering in the starting stage does not occur in a mechanical-type continuously variable transmission in which the movable flange is displaced by pressing roller weights by centrifugal force. Therefore, the inventor eagerly examined the cause of flutter that occurs only in the electronic continuously variable transmission in spite of little difference in starting action between electronic and mechanical types, and obtained the following findings.

In a mechanical continuously variable transmission, as centrifugal force works on the roller weights immediately when engine torque is transmitted and the primary sheave rotates, belt pressing force on the primary sheave side is always produced with increased engine revolutions. Therefore, even if the belt bounces due to torque variation at the time of start, it is held down by the pressing force of the movable flange and brought into a taut state, so that the belt does not flutter.

In an electronic continuously variable transmission, however, the electric motor does not work until the vehicle speed exceeds a specified value. Until the vehicle speed reaches this value, the movable flange on the primary sheave side remains fixed in a low position and belt pressing force on the primary sheave side does not occur. Therefore, the movable flange cannot follow bouncing motion of the belt on the primary sheave side due to torque changes when starting, and belt flutter occurs.

The inventor invented a mechanism for preventing the belt from fluttering even in an electronic continuously variable transmission by implementing a control that produces a belt pressing force, as with the mechanical type, in which tension is applied to the belt when starting.

An embodiment of the invention is now described with reference to the drawing figures. In the drawing figures, components and parts having the same function are provided with the same symbols. The invention is not limited to the embodiment described herein.

Figure 1:
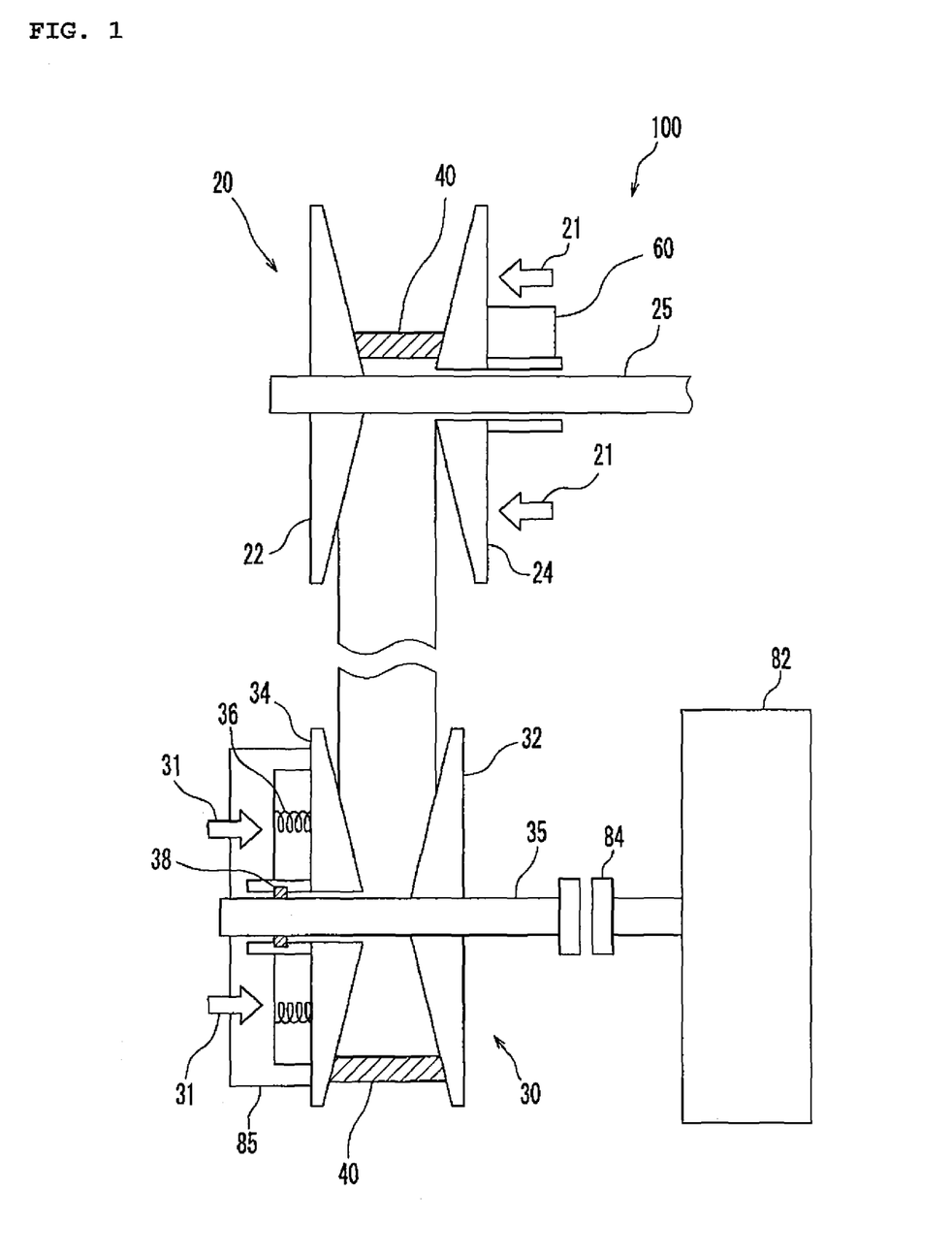
FIG. 1 is a schematic view of a belt-type continuously variable transmission according to an embodiment of the invention.
Figure 2:
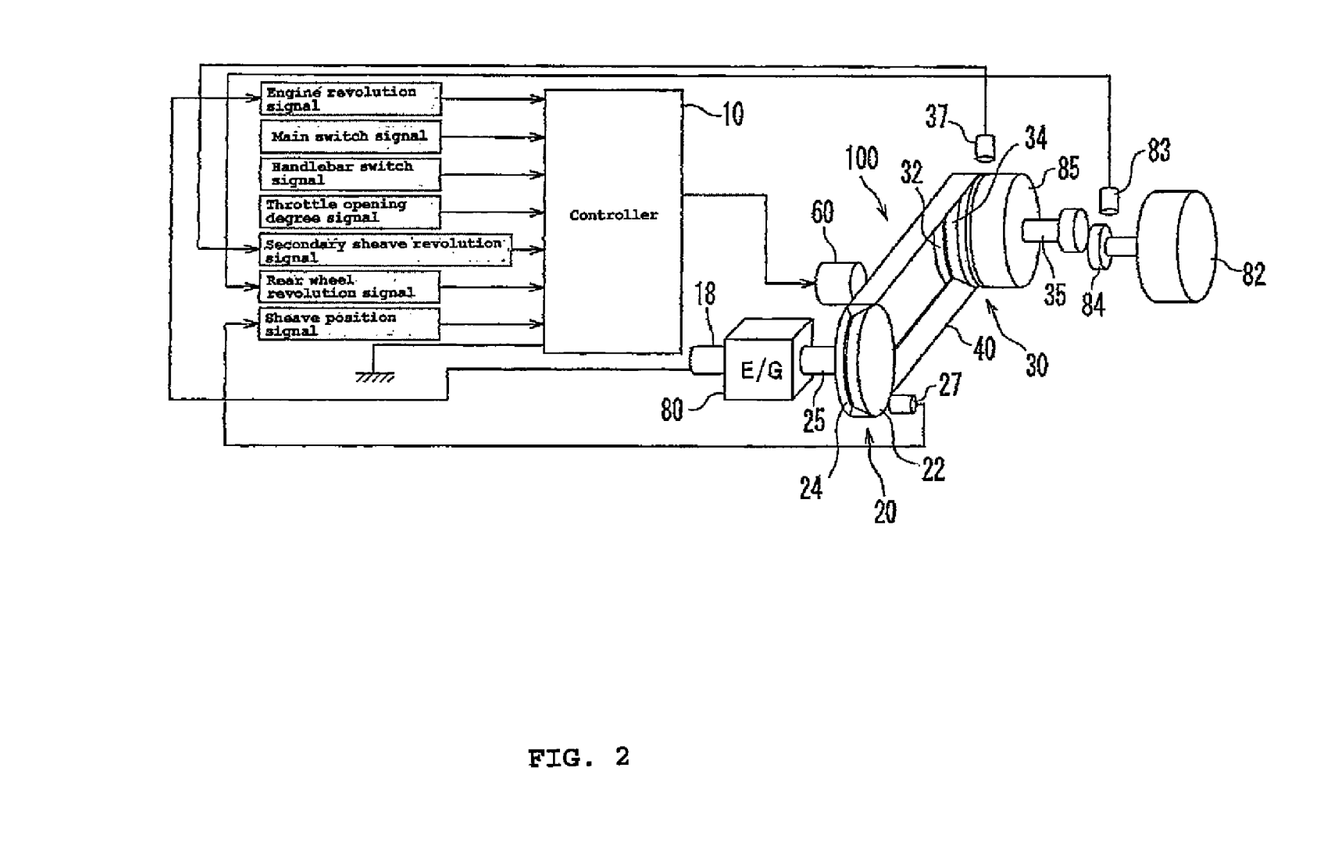
FIG. 2 is a block diagram of a controller of the continuously variable transmission of FIG. 1.

A continuously variable transmission 100 according to an embodiment of the invention is depicted in FIGS. 1 and 2. FIG. 1 is a schematic illustration of continuously variable transmission 100. FIG. 2 is a block diagram of a controller of continuously variable transmission 100.

Continuously variable transmission 100 comprises a primary sheave 20, a secondary sheave 30, and a belt 40 routed around V-grooves of sheaves 20 and 30. By changing sheave groove widths with a groove width regulating mechanism, the round routing radii of belt 40 on the sheaves are regulated, thereby regulating continuously the transmission ratio between the sheaves.

Figure 3:
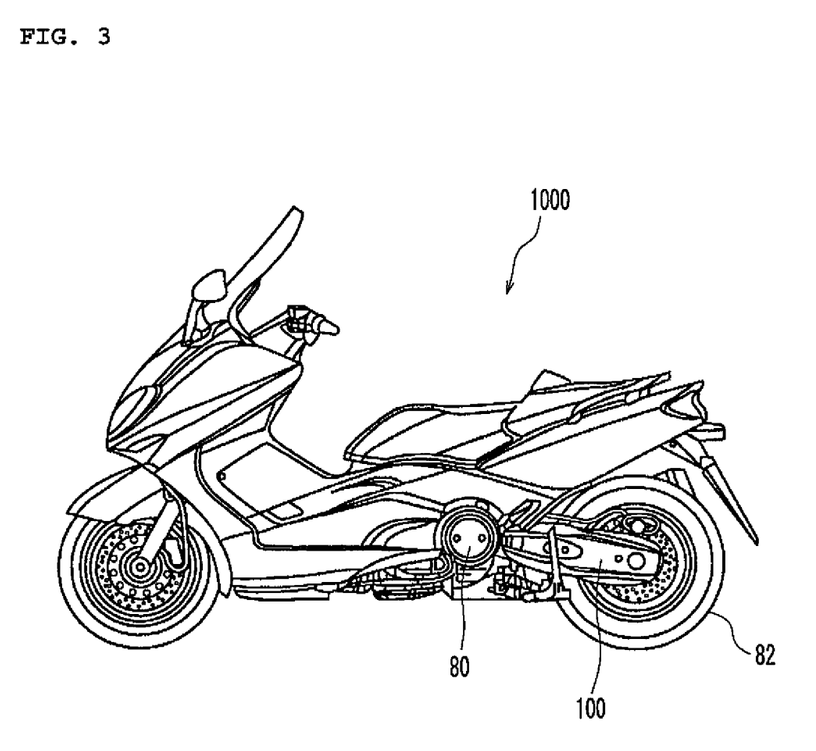
FIG. 3 is a side view of a straddle-type vehicle incorporating the continuously variable transmission of the present invention.

Primary sheave 20 is connected to an engine 80 (FIG. 3). Secondary sheave 30 is connected to a rear wheel 82 through a centrifugal clutch 85 and a final speed reduction mechanism 84. The drive force of engine 80 is transmitted to primary sheave 20 and converted into a rotary force of belt 40. As the rotary force of belt 40 increases, centrifugal clutch 85 is connected, and the rotary force of belt 40 is transmitted to rear wheel 82 through secondary sheave 30 and final speed reduction mechanism 84.

Primary sheave 20 and secondary sheave 30 are respectively made up of fixed flanges 22, 32 and movable flanges 24, 34 attached respectively to rotary shafts 25, 35. Movable flanges 24, 34 are movable in the direction of rotary shafts 25, 35. The fixed flange is also referred to as a fixed sheave, and the movable flange is also referred to as a movable sheave.

Movable flange 34 of secondary sheave 30 is urged by a spring 36 in a direction to narrow the groove width (in the direction of arrow 31). A torque cam 38 applies thrust in the axial direction of movable flange 34 according to the difference between the torque of fixed flange 32 and the torque of movable flange 34. Torque cam 38 comprises a cam groove formed on the movable flange 34 side and a guide pin formed on the rotary shaft 35 side to be slidably inserted into the cam groove. Torque cam 38 has only to be of a constitution integral with movable flange 34 or rotary shaft 35 to produce thrust.

On the other hand, the groove width of primary sheave 20 is regulated by an actuator that controls the motion of movable flange 24. Movable flange 24 can be moved either in a direction to narrow the groove width (toward the top side) or in a direction to widen the groove width (toward the low side) of primary sheave 20.

FIG. 1 represents a standing state of the vehicle (a speed of 0 km/h). In this state, the transmission ratio of continuously variable transmission 100 is normally low (maximum transmission ratio). When the transmission ratio is low, the groove width of primary sheave 20 is the widest, while the groove width of secondary sheave 30 is the narrowest. When vehicle speed increases after a start, the groove width of primary sheave 20 narrows to increase the routing radius of belt 40. As the tension on belt 40 increases, belt 40 is pulled on secondary sheave 30 side. When the tension on belt 40 exceeds the urging force of spring 36, the groove width of secondary sheave 30 is widened. As a result, the routing radius of belt 40 on secondary sheave 30 side decreases. In effect, the transmission ratio decreases (shifts toward the top side).

A controller 10 is described in reference to FIG. 2, which is a block diagram of controller 10 and continuously variable transmission 100.

Actuator 60 for regulating the groove width of primary sheave 20 is electrically connected to speed changing controller 10. In one embodiment, actuator 60 is an electric motor. Actuator 60 is controlled for example, by pulse-width modulation (PWM) output. Controller 10 is provided with an electronic control unit (ECU) having, for example, a microcomputer (MPU). In addition to an electric motor, actuator 60 may comprise other components such as a stepping motor, a linear motor, a solenoid, a hydraulic system, or a pneumatic system.

A throttle opening degree sensor for detecting the opening degree of a throttle is also connected electrically to controller 10. The throttle opening degree sensor outputs to controller 10 a throttle opening degree signal produced at least when the throttle opening degree switches from a closed state to an open state.

Controller 10 controls electric motor 60, on the basis of the signal produced when the throttle opening degree switches from a closed state to an open state, to move movable flange 24 of primary sheave 20 from a normal (low) position in a direction to narrow the groove width of primary sheave 20 (toward the top side). In effect, controller 10, at the time of the start, controls electric motor 60 to press movable flange 24 from the normal, low position toward the top side.

In this embodiment, when the vehicle starts from a standing state (vehicle speed of 0 km/h), controller 10 controls electric motor 60, on the basis of the signal produced when the opening degree of the throttle switches from a closed state to an open state, to move movable flange 24 of primary sheave 20 from a normal (low) position in a direction to narrow the groove width of primary sheave 20 (toward the top side). In other words, when the vehicle starts, movable flange 24 is pressed from the normal, low position toward the top side with electric motor 60 controlled by controller 10. As movable flange 24 is pressed toward the top side, a load is applied in the direction of arrow 21 (FIG. 1) to belt 40, so that the tension on belt 40 increases. Increasing belt tension prevents fluttering of belt 40 due to torque variations at the time the vehicle starts, thereby reducing vibration and noise at the time the vehicle starts.

Movable flange 24 is pressed toward the top side to a position that presses belt 40 such that the transmission ratio does not change and belt fluttering is prevented. At this position, a load is applied to the belt such that the external shape of the belt deforms slightly. In one embodiment, it is a position shifted from the low position toward the top side by 0.2 mm. However, the position of movable flange 24 may be set to any appropriate position according to the condition of use.

A belt load starting condition is set by which movable flange 24 in the low position is pressed toward the top side on the basis of the signal produced when the throttle opening degree switches from closed state to open state. However, as long as a certain load is applied when the vehicle speed is very low at the time of start, belt 40 is prevented from fluttering. Therefore, the signal for starting application of the load is not limited to the signal from the throttle opening degree sensor. For example, the belt load starting condition may be set on the basis of information from the vehicle speed sensor.

Controller 10 and the condition of removing the load on belt 40 are described with reference to FIG. 2.

Controller 10 (transmission ratio controller) is a central component of a control system for controlling the transmission ratio of continuously variable transmission 100.

Controller 10 controls electric motor 60 to move movable flange 24, that has moved in a direction to narrow the groove width of primary sheave 20, back to a normal (low) position on the basis of a specified condition.

Instantaneously moving movable flange 24 back to the normal low position, after it is once pressed to belt 40, or moving back belt 40, effects a quasi damping action. Therefore, it is possible not only to prevent belt 40 from fluttering but also to absorb the flutter of belt 40, further preventing belt flutter at the time of start.

By instantaneously moving back movable flange 24, there is no change in the transmission ratio of continuously variable transmission 100 and no adverse effect on starting performance.

The condition of moving movable flange 24, pushed toward the top side, back to the normal low position, or the removal condition of a belt load, is now described. The removal condition of a belt load is set on the basis of information from the vehicle speed sensor. When the vehicle speed exceeds a threshold value, controller 10 controls electric motor 60 to move movable flange 24, that has moved in a direction to narrow the groove width of primary sheave 20, back to a normal (low) position. By this control, movable flange 24 having moved toward the top side returns again to the low position, and the load temporarily applied to belt 40 is removed.

The threshold value of the vehicle speed is determined based on the vehicle speed range in which belt 40 possibly flutters due to torque variations when the vehicle starts. That is, in the range of very low vehicle speeds below the threshold value, movable flange 24 cannot follow the slackening motion of belt 40 and flutter of belt 40 is possible. In the vehicle speed range above the threshold value, however, as a belt thrust occurs along with increase in the vehicle speed, the belt flutter subsides by itself. In one embodiment, belt flutter subsides at vehicle speeds of 4 km/h and over, so the threshold value is set to 4 km/h or more. The threshold value may be appropriately set according to vehicle constitution, drive conditions and the like.

The vehicle speed sensor is electrically connected to controller 10. In one embodiment, the vehicle speed sensor is a rear wheel revolution sensor 83 that detects revolutions of rear wheel 82. Rear wheel revolution sensor 83 is disposed in the vicinity of rear wheel 82 and connected electrically to controller 10 to output rear wheel revolution signals to controller 10.

A sensor other than rear wheel revolution sensor 83 may be used as long as it is capable of detecting revolution signals in proportion to the vehicle speed. For example, a secondary sheave revolution sensor 37 may be used. In one embodiment, both sensors are used.

Further, while the removal condition of a belt load is set on the basis of vehicle speed information in the above example, the removal condition may be based on information other than the vehicle speed because the belt flutter subsides once the belt thrust occurs after the start.

For example, the removal condition of a belt load may be preset with a timer. Specifically, when a specified period of time has elapsed after the throttle opening degree switches from a closed state to an open state, controller 10 may control electric motor 60 to move movable flange 24, having moved in a direction to narrow the groove width of primary sheave 20, back to the normal (low) position. The vehicle speed after the lapse of the specified period of time needs only to be out of the very low vehicle speed range in which belt 40 flutters due to torque variation. In one embodiment, a timer time is set to 0.3 seconds after the throttle is opened. The timer time may be appropriately set according to the condition of use.

The removal condition of a belt load may be otherwise preset as a pattern of instruction to electric motor 60 rather than based on information physically detected with a sensor or the like. Specifically, a signal output by controller 10 with an instruction for pressing movable flange 24 from the low position toward the top side when the vehicle starts, may also include an instruction for moving movable flange 24 back to the normal low position.

It is also possible to detect connection and disconnection of a starting clutch (either active or passive control type (centrifugal clutch, etc.)), and to remove the belt load when the starting clutch is connected. In FIG. 2, for example, connection of centrifugal clutch 85 may be adopted as the removal condition. Connection or disconnection of clutch 85 may be determined by a detecting a twist amount (phase difference between two specified points) of rotary shaft 35 to which centrifugal clutch 85 is attached.

Still alternatively, it is possible to utilize any information obtained from the rider's operation when the rider gives up a start (such information as on throttle closing operation or brake applying operation) as a signal for the belt load removal.

It is further possible to measure physical variation amounts such as the amount of belt slip, torque variation, or torque tension variation, and to remove belt load when the variation amount falls within a specified range. The belt slip amount may be obtained by comparing the transmission ratio determined from the position of movable sheave 24 of primary sheave 20 with the transmission ratio calculated from the detected actual values of revolutions of primary sheave 20 and secondary sheave 30. As for belt tension, a tensioning member that absorbs belt deflection may be placed between primary sheave 20 and secondary sheave 30, and belt tension measured by detecting the reaction force from the belt to the tensioning member.

Among the removal conditions of a belt load described above, it is most preferable to be based on the vehicle speed information. When belt load is removed according to the actual measurement of the vehicle speed, belt load is securely maintained until the vehicle speed exceeds the very low vehicle speed range (from 0 km/h to the threshold value) even in situations in which sufficient vehicle speed is not obtained, such as when starting on an uphill, so that prevention of belt flutter is actually effected.

Next, controller 10 is described. A sheave position detector 27 for detecting the position of movable flange 24 of primary sheave 20 is connected to controller 10. Sheave position detector 27 outputs information on the movable flange position (sheave position signal) to controller 10. Controller 10 controls electric motor 60 on the basis of such information on the flange position (sheave position signal).

An engine revolution sensor 18 and a primary sheave revolution sensor output an engine revolution signal and a primary sheave revolution signal to controller 10. A main switch signal and a handlebar switch signal may also be input to controller 10.

Controller 10 implements overall control of engine 80 and continuously variable transmission 100 on the basis of the various signals described above. Specifically, a target transmission ratio is obtained while calculating vehicle speed and acceleration based on the throttle opening degree signal, secondary sheave revolution, drive wheel revolution signal, sheave position signal, etc. And, controller 10 controls the actual transmission ratio by implementing ordinary transmission control in which the position of movable flange 24 of primary sheave 20 is controlled by electric motor 60 to realize the target transmission ratio.

Ordinary transmission control is a control in which a transmission ratio corresponding to the drive condition (vehicle speed, throttle opening degree, etc.) of the vehicle is calculated from a pre-registered map, a transmission instruction for realizing the transmission ratio is given to continuously variable transmission 100, and finally the transmission ratio is realized. Ordinary transmission control realizes smooth acceleration and deceleration by decreasing the transmission ratio (controls toward the top side) as the vehicle speed and throttle opening degree increase, and increasing the transmission ratio (controls toward the low side) as the vehicle speed and throttle opening degree decrease.

FIG. 3 shows a vehicle 1000 on which continuously variable transmission 100 is mounted. Vehicle 1000 comprises drive source 80; continuously variable transmission 100 connected to drive source 80; and controller 10 for electronically controlling continuously variable transmission 100. Vehicle 1000 may be a straddle type vehicle such as a scooter-type motorcycle. Drive source 80, in one embodiment, is an engine. The output of engine 80 is regulated according to an accelerator operation member operated by a rider. In a scooter-type vehicle, the accelerator operation member is a throttle grip attached to a handlebar.

In continuously variable transmission 100, primary sheave 20 is connected to engine 80, and secondary sheave 30 is connected through final speed reduction mechanism 84 to rear wheel 82. The drive force of engine 80 outputted according to the throttle operation is converted into rotary force of belt 40 through primary sheave 20. The rotary force of belt 40 is transmitted through secondary sheave 30 to rear wheel 82 to drive rear wheel 82.

While a straddle-type vehicle has been described as an example, continuously variable transmission 100 can prevent belt flutter at the time of start in other types of vehicles. Therefore, applicability of continuously variable transmission 100 is not limited to a straddle-type vehicle. For example, continuously variable transmission 100 may be mounted on a side by side vehicle (SSV) with seats for two persons.

Figure 4:
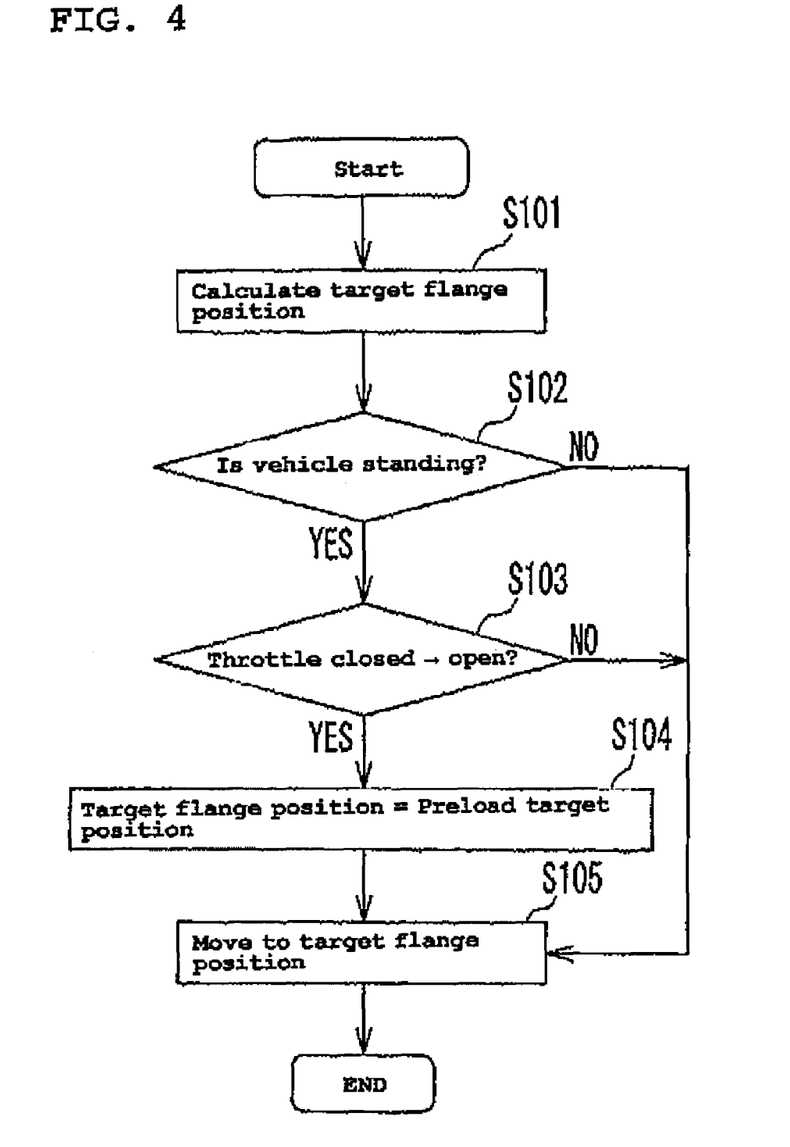
FIG. 4 is a flowchart depicting the process flow of the controller of FIG. 2.

The control flow of controller 10 is described with reference to FIG. 4. First, in step S101, the target flange position is calculated. Controller 10 determines a target transmission ratio based on vehicle speed, engine revolution, accelerator opening degree, etc., calculates the position of movable flange 24 of primary sheave 20 (target flange position) for realizing the target transmission ratio, and calculates the displacement amount of movable flange 24. The target transmission ratio may be either a fixed value different by a certain amount from the present transmission ratio or a value that changes gradually according to vehicle speed, engine revolution, and accelerator opening degree at each time point. In a standing state (vehicle speed of 0), movable flange 24 is controlled to maintain the low state. In other words, the target flange position is set to the low position.

Next, controller 10 determines whether or not the vehicle is currently in the standing state (step S102). If the vehicle is not in the standing state, controller 10 moves movable flange 24 to the target flange position so that the transmission ratio becomes the target transmission ratio (step S105). Thereafter, controller 10 implements ordinary transmission control based on the ordinary map.

If the vehicle is in the standing state, controller 10 determines whether or not the throttle opening degree has switched from a closed state to an open state (step S103). If the throttle has not switched from a closed state to an open state, for example if the throttle is already open, controller 10 moves movable flange 24 to the target flange position to control so that the transmission ratio becomes the target transmission ratio (step S105). Thereafter, controller 10 implements ordinary transmission control based on the ordinary map.

On the other hand, if the throttle has switched from a closed state to an open state, controller 10 changes the target flange position calculated in step S101 to a specified preload target position and rewrites it (step S104). The process then moves to step S105 to move movable flange 24 to the target flange position changed to the preload target position (step S105). Movable flange 24 moved to the preload target position is thereafter controlled to maintain the preload target position until a specified belt load removal condition is inputted.

The specified preload target position is the position shifted toward the top side from the normal movable-flange position (low position) in a standing state. An appropriate position is set so that movable flange 24, having moved to the preload target position, can apply a load to belt 40 and the transmission ratio is not affected. Specifically, it is a position at which movable flange 24 may be pressed to the extent that belt 40 slightly deforms by the load. In one embodiment, it is a position shifted from the low position toward the top side by about 0.2 mm.

Next, removal of load from belt 40 is described. First, controller 10 determines whether or not the specified removal condition of a belt load is met. For example, whether or not the current vehicle speed has exceeded a threshold value is determined. If the current vehicle speed has not exceeded the threshold value, controller 10 holds movable flange 24 in the preload target position. When the vehicle speed increases and exceeds the threshold value, controller 10 controls to move movable flange 24 to the target flange position so that the transmission ratio becomes the target transmission ratio.

At the time the vehicle starts, movable flange 24 is controlled to maintain the low state determined from a pre-registered map until the vehicle speed exceeds a specified value (for example 15 km/h). On the other hand, the vehicle speed threshold value of the removal condition of a belt load is set for example to 4 km/h as described above, very low in comparison with the specified value described above. Therefore, the target flange position that can be calculated after the vehicle speed exceeds the threshold value is always set to the low position. As a result, movable flange 24 having once moved to the preload target position is thereafter controlled to move back again to the low position when the vehicle speed exceeds the threshold value.

Figure 5:
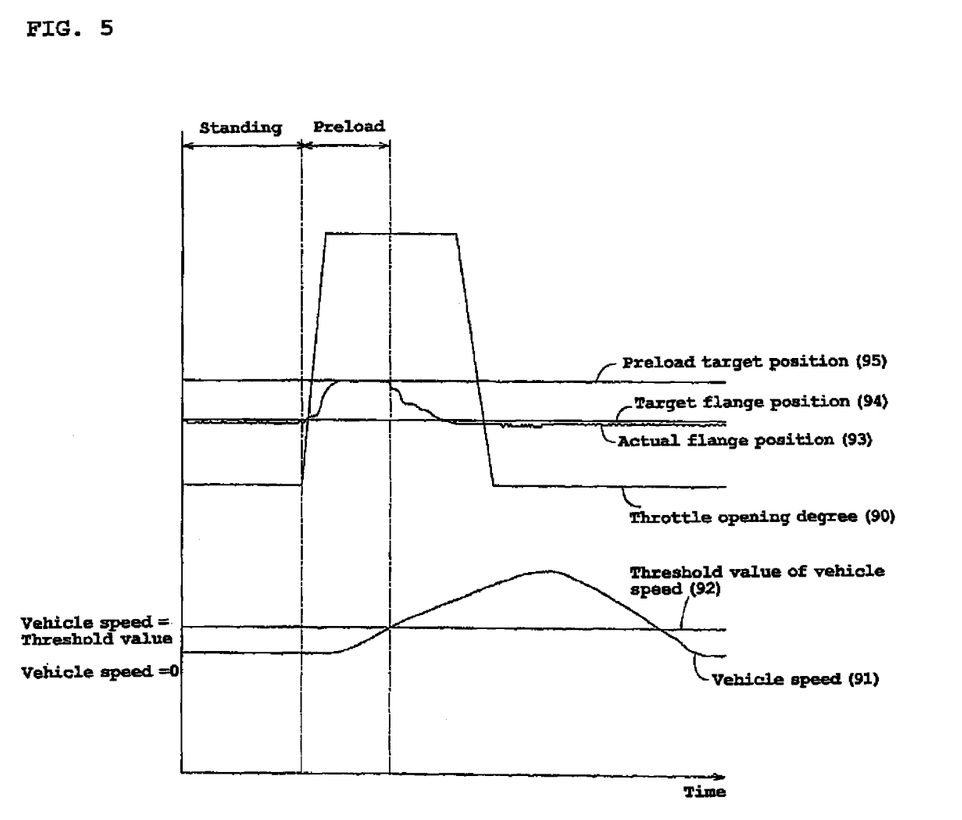
FIG. 5 is a graph of the flange position at the time of starting from a standing state.

FIG. 5 is a graph of situation of the movable flange position and the vehicle speed when the vehicle starts from the standing state. The vertical axis represents values corresponding to respective curves, and the horizontal axis represents time. Curve 90 represents throttle opening degree; curve 91 represents vehicle speed; line 92 represents the threshold value of the vehicle speed; curve 9 represents the actual position of the movable flange; line 94 represents the target flange position; and line 95 represents the preload target position.

When the throttle is opened to start the vehicle from the standing state, movable flange 24 in the low position starts moving toward the preload target position indicated with line 95. As a result, temporary load application onto belt 40 is started. As belt 40 becomes taut and transmission of torque to rear wheel 82 begins, rear wheel 82 rotates to start rising vehicle speed. The speed is detected. When the vehicle speed exceeds the threshold value, the temporary load on belt 40 is removed, and movable flange 24 in the preload target position starts moving toward the low position. Controlling in this way shifts the movable flange temporarily from the low position toward the top side and applies a load to belt 40.

While particular embodiments of the invention have been described, the invention is not limited to such descriptions. The invention may be modified in various ways as a matter of course.

This invention provides a straddle-type vehicle in which belt flutter is prevented when the vehicle starts.

The invention claimed is:

1. An electronically-controlled belt-type continuously variable transmission, comprising:
   a controller;
   an actuator connected to the controller;
   a throttle opening degree sensor for detecting an opening degree of a throttle, wherein the throttle opening degree sensor is connected to and outputs to the controller a signal produced at least when the throttle opening degree is switched from a closed state to an open state;
   a primary sheave comprising a fixed flange and a movable flange attached to a rotary shaft, wherein the actuator regulates a groove width of the primary sheave by controlling motion of the movable flange;
   a secondary sheave;
   and
   a belt routed around V-grooves of the primary sheave and the secondary sheave to continuously change a transmission ratio by changing groove widths of the primary and secondary sheaves,
   wherein
   at a time except when a vehicle starts from a standing state, the controller controls the actuator to move the movable flange to an ordinary target flange position such that the transmission ratio is changed to a target transmission ratio,
   at a time when the vehicle starts from the standing state, the controller, on the basis of the signal produced when the throttle opening degree is switched from the closed state to the open state, controls the actuator to move the movable flange from a normal low position in the standing state to a specified preload target position where the movable flange is shifted from the normal low position in the standing state in a direction of decreasing the groove width of the primary sheave substantially instantaneously such that a routing radius of the belt on the primary sheave is substantially unchanged, thereby the transmission ratio is substantially unchanged from the standing state, and
   at a time when a specified belt load removal condition is satisfied, the controller, based on determining that the specified belt load removal condition is satisfied, controls the actuator to move back the movable flange from the specified preload target position to the normal low position such that the transmission ratio is substantially unchanged from the standing state.

2. The continuously variable transmission of claim 1, further comprising:
   a vehicle speed sensor for detecting vehicle speed connected to the controller,
   wherein the specified belt load removal condition is that the detected vehicle speed exceeds a threshold value.

3. The continuously variable transmission of claim 2, wherein the threshold value is approximately 4 km/hour.

4. The continuously variable transmission of claim 2, wherein the vehicle speed sensor is a rear wheel revolution sensor.

5. The continuously variable transmission of claim 1, further comprising:
   a secondary sheave revolution sensor for detecting revolutions of the secondary sheave,
   wherein the specified belt load removal condition is that the detected revolutions of the secondary sheave exceeds a threshold value.

6. The continuously variable transmission of claim 1, wherein the specified belt load removal condition is elapse of a specified period of time after the throttle opening degree is switched from the closed state to the open state.

7. The continuously variable transmission of claim 6, wherein the specified period of time is approximately 0.3 seconds.

8. The continuously variable transmission of claim 1, wherein the specified condition is connection of a centrifugal clutch.

9. The continuously variable transmission of claim 1, wherein:
 the secondary sheave comprises a fixed flange and a movable flange attached to a rotary shaft, and
 the movable flange of the secondary sheave is urged with a spring and a torque cam in a direction of decreasing groove width.

10. The continuously variable transmission of claim 1, wherein at the time the vehicle starts from the standing state, the movable flange that has moved in the direction of decreasing the groove width increases tension on the belt routed around the V-groove of the primary sheave.

11. The continuously variable transmission of claim 1, wherein the movable flange is moved from the normal low position by a distance of approximately 0.2 mm.

12. A straddle-type vehicle comprising the continuously variable transmission of claim 1.

13. A method for preventing fluttering of a belt at start up in a continuously variable transmission of a vehicle, comprising:
 determining if the vehicle is in a standing state and, if the vehicle is not in the standing state, implementing ordinary transmission control including moving a movable flange of a primary sheave of the continuously variable transmission to an ordinary target flange position such that a transmission ratio is changed to a target transmission ratio;
 determining if a throttle has switched from a closed state to an open state and, if the throttle has not switched from the closed state to the open state, implementing the ordinary transmission control; and
 if the vehicle is in the standing state and the throttle has switched from the closed state to the open state, moving the movable flange of the primary sheave from a normal low position to a preload target position where the movable flange is shifted from the normal low position in the standing state to increase tension on the belt substantially instantaneously such that a routing radius of the belt on the primary sheave is substantially unchanged, and, in response to a specified belt load removal condition being satisfied, moving back the movable flange to the normal low position such that the transmission ratio is substantially unchanged from the standing state,
 wherein the preload target position is maintained until the specified belt load removal condition is satisfied.

14. The method of claim 13, wherein the preload target position is a shift from the normal low position toward a top side by about 0.2 mm.

15. The method of claim 13, wherein the specified belt load removal condition is that vehicle speed exceeds a threshold value.

16. The method of claim 15, wherein the threshold value is approximately 4 km/hour.

17. The method of claim 13, wherein the specified belt load removal condition is that revolutions of a secondary sheave exceeds a threshold value.

18. The method of claim 13, wherein the specified belt load removal condition is elapse of a specified period of time after the throttle has switched from the closed state to the open state.

19. The method of claim 18, wherein the specified period of time is approximately 0.3 seconds.

* * * * *